US012641389B2

(12) United States Patent
Messingher Lang et al.

(10) Patent No.: US 12,641,389 B2
(45) Date of Patent: May 26, 2026

(54) SPATIAL BLENDING OF AUDIO

(71) Applicant: Apple Inc., Cupertino, CA (US)

(72) Inventors: Shai Messingher Lang, Santa Clara, CA (US); Joshua D. Atkins, Lexington, MA (US); Scott A. Wardle, Santa Cruz, CA (US); Symeon Delikaris Manias, Playa Vista, CA (US)

(73) Assignee: Apple Inc., Cupertino, CA (US)

( * ) Notice: Subject to any disclaimer, the term of this patent is extended or adjusted under 35 U.S.C. 154(b) by 343 days.

(21) Appl. No.: 18/458,077

(22) Filed: Aug. 29, 2023

(65) Prior Publication Data

US 2024/0098442 A1 Mar. 21, 2024

Related U.S. Application Data

(60) Provisional application No. 63/376,524, filed on Sep. 21, 2022.

(51) Int. Cl.
*H04S 7/00* (2006.01)

(52) U.S. Cl.
CPC ........... *H04S 7/302* (2013.01); *H04S 2400/11* (2013.01)

(58) Field of Classification Search
CPC ..................... H04S 7/302–304; H04S 2400/11
See application file for complete search history.

(56) References Cited

U.S. PATENT DOCUMENTS

| | | | | |
|---|---|---|---|---|
| 2014/0153751 | A1* | 6/2014 | Wells | H04S 7/304 381/74 |
| 2020/0145773 | A1* | 5/2020 | Arteaga | H04S 3/008 |
| 2023/0274756 | A1 | 8/2023 | Messingher Lang et al. | |
| 2025/0227427 | A1* | 7/2025 | Moradi Ashour | H04S 7/302 |

OTHER PUBLICATIONS

U.S. Appl. No. 63/254,389—provisional application corresponding to US-20250227427-A1 (Year: 2001).*

* cited by examiner

*Primary Examiner* — James K Mooney
(74) *Attorney, Agent, or Firm* — Aikin & Gallant, LLP

(57) ABSTRACT

An audio processing system may obtain a size of a visual object to present to a display. The audio processing system may determine a virtual placement for each of a plurality of virtual speakers at least based on the size of the visual object. Each of the plurality of virtual speakers may be spatially rendered at each virtual placement through binaural audio, for playback through head-worn speakers. Other aspects are also described and claimed.

18 Claims, 6 Drawing Sheets

SPATIAL BLENDING OF AUDIO

This nonprovisional patent application claims the benefit of the earlier filing date of U.S. provisional application No. 63/376,524 filed Sep. 21, 2022.

FIELD

One aspect of the disclosure relates to audio processing, in particular, to spatial presentation of audio according to presentation of a visual object.

BACKGROUND

Sound, or acoustic energy, may propagate as an acoustic wave (e.g., vibrations) through a transmission medium such as a gas, liquid or solid. A microphone may sense acoustic energy in the environment. Each microphone may include a transducer that converts vibrations in the transmission medium into an electronic signal which may be analog or digital. The electronic signal, which may be referred to as a microphone signal, characterizes and captures sound that is present in the environment.

An audio work may include a recording of a sound field which includes one or more microphone signals over a length of time. An audio work may also be generated electronically (e.g., without microphone capture) by synthesizing one or more sounds to build an audio signal. An audio work may be associated with visual objects such as graphics, video, a computer application, or other visual objects.

A processing device, such as a computer, a smart phone, a tablet computer, or a wearable device, can run an application that plays audio to a user. For example, a computer can launch an application such as a movie player, a music player, a conferencing application, a phone call, an alarm, a game, a user interface, a web browser, or other application. The application may cause audio to be output to a user through speakers while simultaneously displaying one or more visual objects associated with the audio to the user.

BRIEF SUMMARY

Technology is providing increasingly immersive experiences for a user. Such an immersive experience may include immersion of visual and audio senses such as spatialized audio and/or 3D visual components. Visually displayed objects may be associated with and presented simultaneous with sound. The sound may be presented through surround sound loudspeakers (e.g., 5.1, 6.1, 7.1, etc.). In an immersive experience, however, a user or system may have increased control as to how an object is visually presented (e.g., where the visual object is to be located or how large the visual object is to be presented). As such, it may be beneficial to present audio in a manner that co-exists with visual objects in an immersive environment and provides audio feedback cues to the user that may relate to the visual state of the visual object.

Further, a variety of audio formats exist, such as 5.1, 6.1, 7.1, stereo, object-based audio, or other audio format. As such, it may be beneficial to translate existing audio formats to an immersive audio format in a consistent and agnostic manner, while allowing for dynamic changes in the immersive audio format.

In one aspect, a computer-implemented method, includes obtaining a visual characteristic, such as size, of a visual object (e.g., to present to a display), determining a virtual placement for each of a plurality of virtual speakers at least based on the size of the visual object, and spatially rendering each of the plurality of virtual speakers at the respective virtual placements through binaural audio which includes a left audio channel and a right audio channel, for playback through head-worn speakers.

In some examples, the method includes moving the plurality of virtual speakers closer together in response to the size of the visual object becoming smaller and moving the plurality of virtual speakers apart in response to the size of the visual object becoming larger.

In some examples, the method may operate in one or more first modes. In some examples, in a first mode, a virtual center channel of the plurality of virtual speakers is oriented relative to a position of the visual object on the display. In some examples, in the first mode, the virtual placement of each of the plurality of virtual speakers may be constrained to a sphere around a listening position or a user position. In some examples, each of the one or more first modes defines a unique placement of the plurality of virtual speakers.

In a first of the one or more first modes, the plurality of virtual speakers may be distributed on a sphere around a listening position (e.g., a user) with a first spacing between the plurality of virtual speakers that corresponds to a first size of the visual object. In a second of the one or more first modes, the plurality of virtual speakers may be distributed on the sphere with a second spacing between the plurality of virtual speakers that corresponds to a smaller second size of the visual object, wherein the second spacing is less than the first spacing.

In some examples, in response to movement of a user head, the plurality of virtual speakers is rotated on the sphere to maintain a direction of the plurality of virtual speakers at the visual object. The listening position may be updated based on tracking of the user position.

In some examples, in a second mode, each of the plurality of virtual speakers are placed at the visual object. In the second mode, the virtual placement of the plurality of virtual speakers may not be constrained to a sphere around the listening position, whereas in the first mode, the virtual placement of the plurality of virtual speakers may be constrained to the sphere. In some examples, the second mode is entered into (from any of the one or more first modes) in response to the size of the visual object being smaller than a threshold. Additionally, or alternatively, the second mode may be entered into (from any of the one or more first modes), in response to a request (e.g., a user input) to select and to move the visual object within the immersive environment.

In some examples, transitioning to the second mode (e.g., from any of the one or more first modes) includes animating movement of the plurality of virtual speakers from spaced positions on a sphere around a listening position to being placed at the visual object. Similarly, transitioning out of the second mode (e.g., into any of the one or more first modes) may include animating movement of the plurality of virtual speakers from being placed at the visual object to being at spaced positions constrained to a sphere around the listening position. Transitioning to the second mode or transitioning out of the second mode may include preserving an overall acoustic energy of the plurality of virtual speakers.

In some examples, the method includes obtaining one or more audio channels with a base audio format and distributing each of the one or more audio channels to the plurality of virtual speakers based on a position associated with each of the one or more audio channels. Examples of a base audio format may include a multi-channel speaker layout (e.g., 5.1, 6.1, 7.1), a monophonic audio channel, stereo, spherical harmonics (e.g., Ambisonics), or object-based audio. The one or more audio channels of the base audio format may be mapped to the plurality of virtual speakers using vector-base amplitude panning (VBAP). In some examples, the method may include interpolating between the plurality of virtual speakers to distribute each of the one or more audio channels of the base audio format to the plurality of virtual speakers.

In yet another aspect of the disclosure here, a method for presenting a visual object along with audio of the visual object proceeds as follows. First, a processor is presenting, on a display, the visual object in accordance with a first visual characteristic (e.g., an original size.) Concurrently (or even simultaneously), the processor is presenting audio of the visual object, in accordance with a first audio characteristic. In one instance, the first audio characteristic is an original arrangement of two or more virtual speakers in a rendering algorithm, in which the virtual speakers have an original spacing therebetween. Next, the processor receives a user input to select the visual object (e.g., grab the visual object.) In response, and while the user input is being maintained, the processor changes presentation of the audio to be in accordance with a second audio characteristic, and it changes presentation of the visual object to be in accordance with a second visual characteristic. In one instance, the second visual characteristic is a smaller size of the visual object, or a movement of the visual object. As to the second audio characteristic, it may be a different arrangement of the virtual speakers such as one where the spacing therebetween is smaller than the original spacing. Next, in response to the user input no longer being maintained (e.g., the user deselects or ungrabs the visual object, which may also signal the visual object to stop moving), the processor changes presentation of the audio back to the first audio characteristic, concurrently (or even simultaneously) with changing presentation of the visual object back to the first visual characteristic (e.g., the visual object resumes its original size.)

In one instance of the method in the previous paragraph, when presenting the visual object in accordance with the first visual characteristic, the spatial audio is presented in accordance with the first audio characteristic in which the virtual speakers are distributed around a listening position. Then, when presenting the visual object in accordance with the second visual characteristic, the spatial audio is presented in accordance with the second audio characteristic in which the virtual speakers are located at the visual object. In one instance, the virtual speaker arrangement collapses to a single source located at the virtual position of the visual object. In another instance, when presenting the spatial audio in accordance with both the first audio characteristic and the second audio characteristic, the virtual speakers remain distributed on the same sphere, e.g., one having its center at the listening position, except that the spacing between the virtual speakers changes, e.g., the spacing is larger in the first audio characteristic than it is in the second audio characteristic.

Now, if the user input moved the visual object to a new position, then when changing the presentation back to the first audio characteristic the processor presents the spatial audio (in accordance with the arrangement of virtual speakers as distributed around the listening position) relative to the new position of the visual object. In other words, the sound of the visual object will be spatialized to be perceived as coming from the direction of the visual object at its new position.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
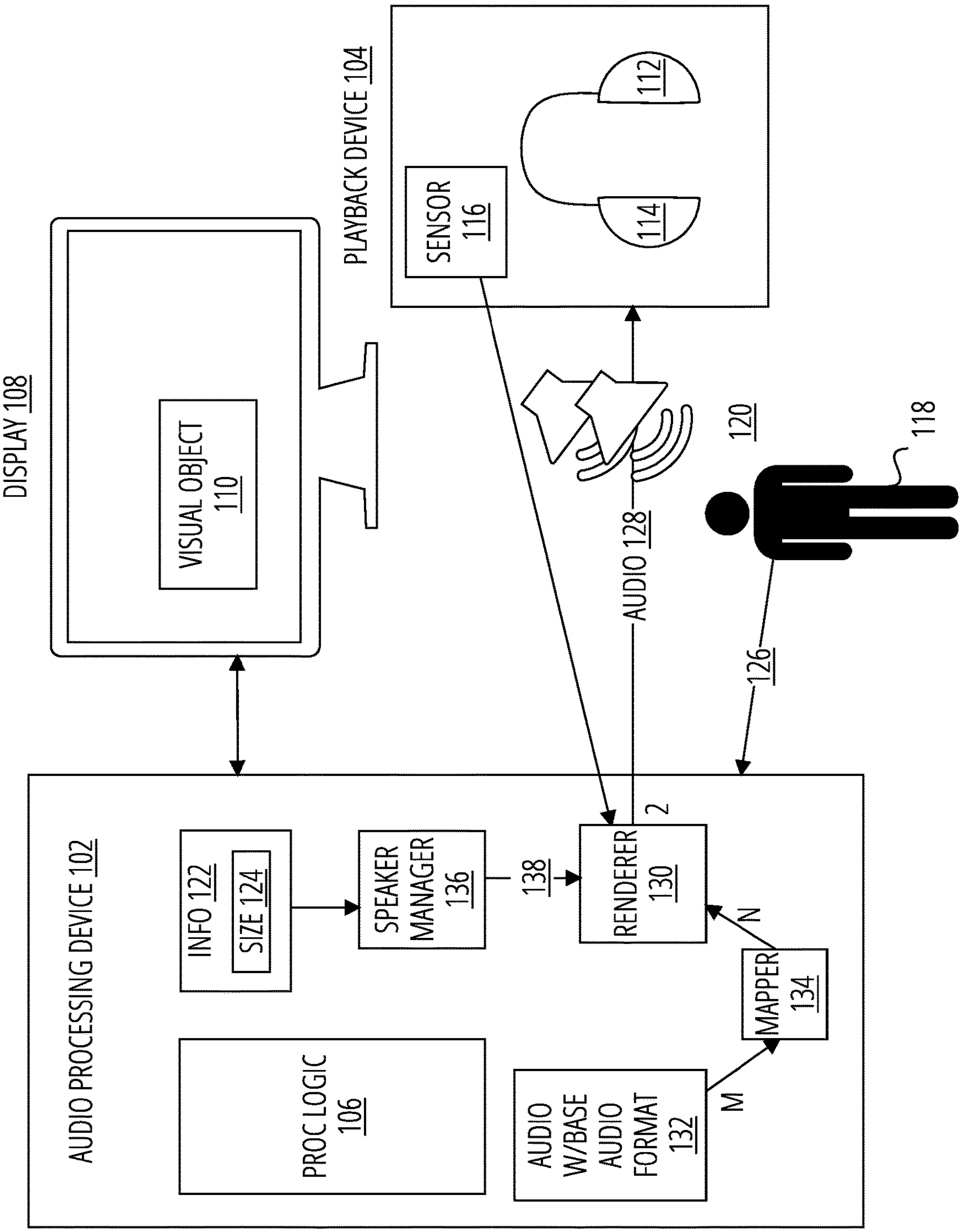
FIG. 1 shows an example of an audio processing device for providing an immersive audio and visual experience with virtual speakers, in accordance with some aspects.

Humans can estimate the location of a sound by analyzing the sounds at their two ears. This is known as binaural hearing and the human auditory system can estimate directions of sound using the way sound diffracts around and reflects off of our bodies and interacts with our pinna. These spatial cues can be artificially generated by applying spatial filters such as head-related transfer functions (HRTFs) or head-related impulse responses (HRIRs) to audio signals. HRTFs are applied in the frequency domain and HRIRs are applied in the time domain.

The spatial filters can artificially impart spatial cues into the audio that resemble the diffractions, delays, and reflections that are naturally caused by our body geometry and pinna. The spatially filtered audio, which may be referred to as binaural audio, can be produced by a spatial audio reproduction system (a renderer) and output through headphones. Spatial audio can be rendered for playback, so that the audio is perceived to have spatial qualities. For example, spatial audio may reproduce qualities of an original sound scene, such as a talker in front of the capture device, and a bird above the capture device. In other examples, spatial audio may reproduce a fictional sound scene, with spatial qualities authored by an audio content creator. An audio content creator may specify spatial information such as a direction, distance, or position associated with a sound source in the fictional sound scene, and a renderer may render a sound source according to the spatial information.

The spatial audio may correspond to visual components that together form an audiovisual work. An audiovisual work may be associated with an application, a user interface, a movie, a live show, a sporting event, a game, a conferencing call, or other audiovisual experience. In some examples, the audiovisual work may be integral to an extended reality (XR) environment.

Spatial audio reproduction may include spatializing sound sources in a scene. The scene may be a three-dimensional representation which may include position of each sound source. In an immersive environment, a user may be able to move around the virtual environment and interact in the scene.

An operating system may manage various aspects of a device such as which applications are active, presented to a user, and how the audio of that application is to be presented to the user. This operating system may present applications in a traditional 2D environment, or in a 3D environment (e.g., an XR environment). Each application may be presented with a view (e.g., an application window) that shows content which is specific to that application.

As described, it may be beneficial to maintain a nexus between the visual objects of an immersive experience and the audio components of the immersive experience. In some aspects, in an XR environment, or in a traditional environment (with a stationary 2D display), an operating system may couple behavior or presentation of a visual object (e.g., an application) with arrangement of virtual speakers that play sound to the user.

For example, a system or computer-implemented method may serve as an operating system, a service, or other computer-implemented method that arranges virtual speakers around a user based on the size and/or other metadata of a visual object. The visual object may be an application window that displays application-specific visual content (e.g., a movie player, a music player, a game, a user interface, a web browser, etc.). Audio of that visual object may be played through virtual speakers placed around the user. The virtual speakers may be generated through a binaural renderer and played back through binaural audio that comprises a left audio channel and a right audio channel. The binaural audio may be output through a headphone set.

In some examples, the virtual speakers may be managed in different modes. For example, one or more first modes may specify placement of each virtual speaker surrounding a user. The one or more first modes may correspond to different sound stages or sizes of sound stages of the visual object. For example, a large presentation of the visual object may correspond to a first arrangement of the virtual speakers that are spaced far apart from each other. A medium presentation of the visual object may correspond to a second arrangement of the virtual speakers that have some of the speakers being spaced or clustered closer together.

Further, in a second mode, each of the virtual speakers may be rendered on the visual object and/or at a minimum spacing between the virtual speakers. This mode may correspond to a small sound stage and small presentation of the visual object. The system may transition between any of the first modes and/or between any of the first modes and the second mode based on the size of the visual object and/or user input. During transitions, the system may animate movement of the virtual speakers thereby providing additional user feedback that the sound stage and presentation of the visual object is changing. Further, without animation, the transition between modes may be disorienting to listeners when virtual speakers 'jump.'

In some examples, the visual object may be presented to a traditional stationary 2D display, a mobile display, or to a head-mounted display (HMD). In some examples, the display may include a stereo display (e.g., a 3D display) that conveys depth perception to the viewer by stereopsis for binocular vision.

FIG. 1 shows an example of an audio processing device 102 for providing an immersive audio and visual experience with virtual speakers, in accordance with some aspects. An audio processing device 102 may include processing logic 106 that is configured to perform operations and methods described in the present disclosure. Processing logic 106, which may also be referred to as a processing device, may comprise hardware (e.g., circuitry, dedicated logic, programmable logic, a processor, a central processing unit (CPU), a system-on-chip (SoC), machine-readable memory, etc.), software (e.g., machine-readable instructions stored or executed by processing logic), or a combination thereof. Processing logic 106 may perform the various operations or blocks described herein.

At virtual speaker management block 136, processing logic 106 may obtain a size 124 of a visual object 110 to present to a display 108. The size 124 may include a length, height, shape, area, and/or volume of the visual object 110. For example, the visual object may take the form of an application window (e.g., a rectangular window) that is presented on the display 108. Processing logic 106 may also obtain other information 122 about the visual object 110, such as a location of the visual object in the display 108 or in a virtual environment, a status of the visual object (e.g., whether or not the visual object is active, moving, etc.), a base audio format of audio channels that are associated with the visual object 110, and/or other information related to the visual object.

Processing logic 106 may determine a virtual placement 138 for each of a plurality of virtual speakers 120 at least based on the size 124 of the visual object 110. The virtual placements 138 may refer to a position (e.g., a direction or a position) which may be in virtual space. Virtual placements may be determined as a relative position (e.g., relative to a user 118) or an absolute position in virtual space.

In some examples, processing logic 106 may place the plurality of virtual speakers 120 closer together in response to the size 124 of the visual object 110 being small, and/or place the plurality of virtual speakers 120 farther apart in response to the size 124 of the visual object 110 becoming larger. The size 124 of the visual object 110 may change in response to a request (e.g., user input 126) or automatically (e.g., triggered by other conditions).

Further, processing logic 106 may move virtual speakers 120 dynamically, even after being initially placed. For example, the plurality of virtual speakers 120 may be moved closer together in response to the size 124 of the visual object 110 becoming smaller, and/or moved farther apart in response to the size 124 of the visual object 110 becoming larger.

Processing logic 106 may spatially render each of the plurality of virtual speakers 120 at each virtual placement through binaural audio 128. Binaural audio 128 may include a left audio channel and a right audio channel, for playback through head-worn speakers 112, 114. Head-worn speakers 112, 114, may include a left speaker 114 and a right speaker 112 that may be extra-aural speakers or may be worn on, over, or in an ear of a user 118. As described, binaural audio 128 may be spatialized (with spatial cues) so that each of the virtual speakers 120 sound like independent speakers coming from respective virtual placements, when heard with head-worn speakers 112, 114. Head-worn speakers 112, 114 may be integral to an audio playback device 104 such as a headphone set, earbuds, a head-mounted display, or other audio playback device 104. In some examples, any audio processing device 102, display 108, or audio playback device 104 may be integrated with each other, or separate devices.

Visual object 110 may be associated with one or more audio channels with a base audio format 132. Examples of the base audio format 132 may include a multi-channel speaker layout (e.g., 5.1, 6.1, 7.1), a monophonic audio channel, stereo, spherical harmonics, or object-based audio. For example, visual object 110 may include a videogame that has one or more object-based audio channels, each corresponding to a sound source in the videogame. In another example, visual object 110 may include a movie that includes loudspeaker channels formatted as 5.1 surround sound.

Processing logic 106 may obtain the audio channels with base audio format 132 and, at mapping algorithm block or mapper 134, distribute each of them to the plurality of virtual speakers 120 based on a position associated with each of the one or more audio channels. Mapper 134 may redistribute audio from each of audio channels (e.g., M audio channels) to N number of virtual speakers 120. For example, if the audio channels include a rear left speaker channel, that channel may be distributed to one or more of the plurality of virtual speakers 120 according to a proximity between i) the designated position of the rear left speaker channel, and ii) the placements of each of the virtual speakers 120.

In some examples, the one or more audio channels of the base audio format 132 may be mapped to the plurality of virtual speakers using vector-base amplitude panning (VBAP). Further, once those audio channels are mapped to virtual speakers 120, the mapping may be adjusted when placement of the virtual speakers changes, with low overhead. For example, processing logic may interpolate between the plurality of virtual speakers to distribute each of the one or more audio channels of the base audio format to the plurality of virtual speakers. This is further described in other sections.

In some examples, at mapper 134, processing logic may render each of the one or more audio channels as the corresponding one of the plurality of virtual speakers. The virtual placement of each of the plurality of virtual speakers may be determined based on a position associated with each of the one or more audio channels. A position that is associated with that channel, such as a loudspeaker position in a surround sound format, or a sound source in an object-based audio format, may be mapped to a sphere (around a listening position) relative to the visual object 110, with a direction that matches that position of the audio channel. For example, an audio channel of a center-right speaker may be mapped to a position on the sphere that is to the center-right of the visual object on the sphere, relative to the visual object. Similarly, an audio channel of an airplane in object-based audio may have positional metadata describing the airplane being overhead. The position may be mapped to a top position of the sphere, relative to the visual object 110. The one or more audio channels may be mapped to the virtual placement of each of the plurality of virtual speakers using vector-base amplitude panning (VBAP). Processing logic may interpolate between control points (e.g., on the sphere's surface) to place each of the one or more audio channels at the respective virtual placements. As such, each of the one or more audio channels may correspond to each of the virtual speakers on a one-to-one basis and be rendered as a corresponding one of the plurality of virtual speakers.

Processing logic may, at renderer block 130, spatially render each of the virtual speakers 120 at respective virtual placements 138. For example, the processing logic may apply HRTFs or HRIRs to the N plurality of virtual speakers 120 to spatialize them at the intended virtual placements in view of the user position. Further, renderer block 130 may spatially render those virtual speakers in accordance with a user position. For example, one or more sensors 116 may track position of user 118. Sensor 116 may include an inertial measurement unit (IMU), an accelerometer, a gyroscope, a camera, or other sensor. Renderer block 130 may apply one or more localization algorithms to determine the position (e.g., a location, position, or direction) of the user 118. Although shown as being integral to audio playback device 104, sensor 116 may be integral to any of the other devices such as audio processing device 102, display 108, or distributed among them.

In some examples, processing logic 106 may render the virtual speakers 120 to compensate for the user position (or changes in the user position) to maintain a fixed position of each of the virtual speakers in the virtual space. Without such compensation, the virtual speakers would appear to be anchored to and travel with the user rather than anchored to the physical and the virtual space.

The placements 138 of the virtual speakers may be predefined and stored in settings that are accessible to processing logic 106. Processing logic 106 may determine which mode to operate in based on information 122 and/or size 124, and then render the N channels of the virtual speakers accordingly. In some examples, determining the virtual placement for each of the plurality of virtual speakers 120 includes operating in one or more first modes, in accordance with determining that the size of the visual object 110 satisfies a first criterion. In some examples, determining the virtual placement for each of the plurality of virtual speakers 120 includes operating in one or more second modes, in accordance with determining that the size of the visual object 110 satisfies a second criterion. The first and second criterion can include distinct size thresholds of the visual object 110, or other fields which may be defined in information 122.

The size of the visual object 110 may satisfy the first criterion (e.g., the first mode may be active). Processing logic 106 may obtain an updated size of the visual object 110 and, in accordance with determining that the updated size satisfies the second criterion (e.g., a size criterion), processing logic 106 may transition to the second mode by animating movement of the plurality of virtual speakers from their respective virtual placements (e.g., on a sphere) to the visual object 110.

Similarly, the size of the visual object 110 may satisfy the second criterion (e.g., the second mode may be active). Processing logic 106 may obtain an updated size of visual object 110. In accordance with determining that the updated size of the visual object 110 satisfies the first criterion, processing logic 106 may transition to the one or more first modes by animating movement of the plurality of speakers from the visual object 110 to respective virtual placements (e.g., distributed on the sphere).

At virtual speaker management block 136, processing logic 106 may determine a mode of operation based on information 122 (e.g., whether certain fields of information 122 satisfy the first or second criterion). Each mode of operation may define unique placements of the virtual speakers 120, as well as other parameters such as reverberation, a direct to reverberant ratio (DRR) of each channel, delay of each virtual speaker (e.g., specifying delay of one of the virtual speakers), an overall low frequency gain, and other behavior. Each mode may represent a distinct group of settings applied based on the information 122, or size 124, or both.

In some examples, virtual speaker management block 136 may include a large mode, a medium mode, and a small mode. The large and medium mode may be referred to as one or more first modes. The small mode may be referred to as a second mode. The various modes are further described in other sections, such as with reference to FIG. 2, FIG. 3, FIG. 4, or FIG. 5.

Figure 2:
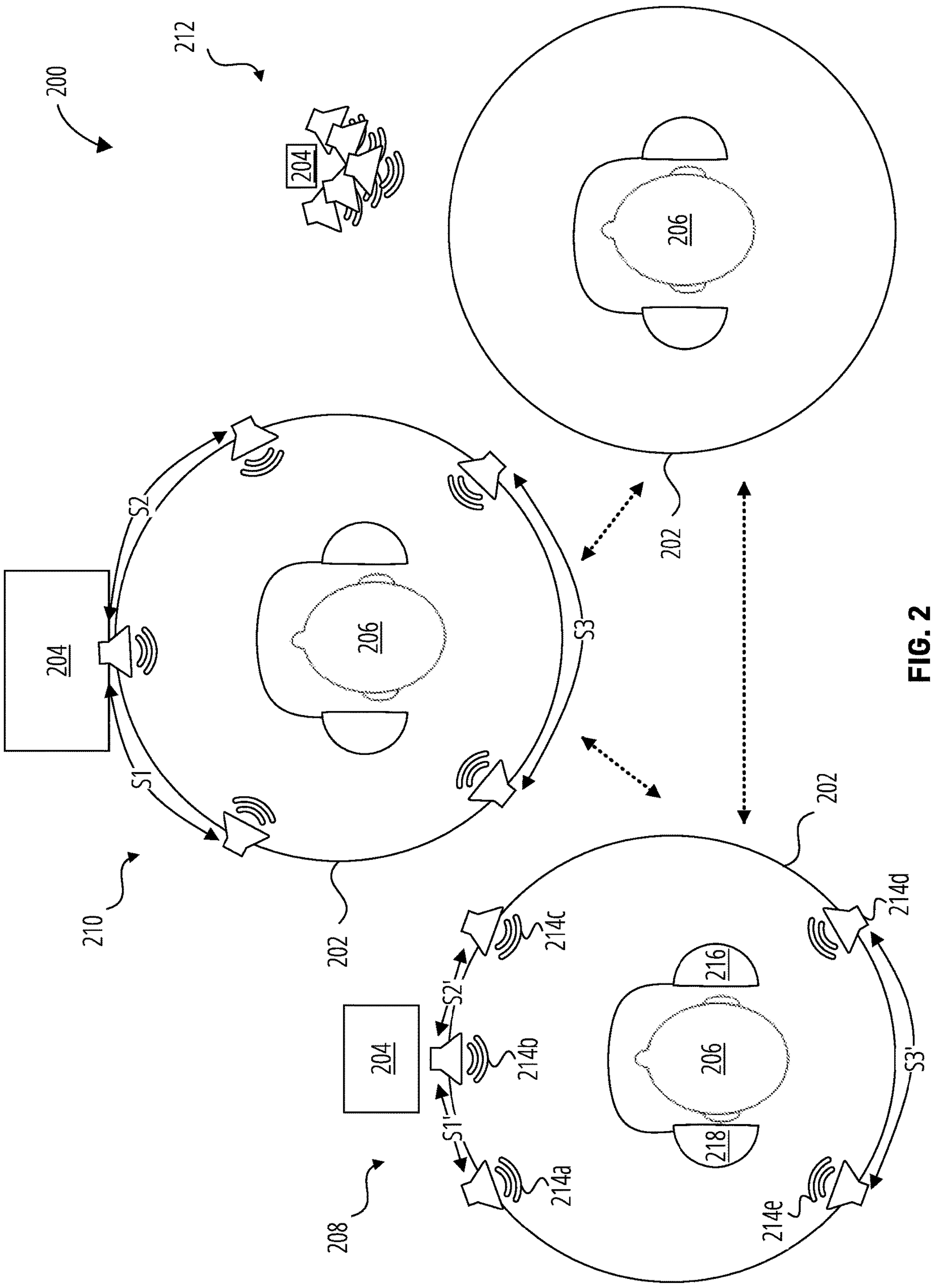
FIG. 2 shows an example of providing an immersive audio and visual experience with virtual speakers under a plurality of modes, in accordance with some aspects.

FIG. 2 shows an example of providing an immersive audio and visual experience with virtual speakers under a plurality of modes, in accordance with some aspects. An immersive audiovisual system 200 may operate according to various audio modes such as a first mode 208, another first mode 210, and a second mode 212. The system 200 may transition between modes seamlessly, based on size of visual object 204, other information (e.g., 122) about visual object 204, and/or user input. The system 200 may include processing logic that is configured to perform the operations described.

The system 200 may include a plurality of speakers 218 and 216 that may be worn respectively near, on, in, or over each ear of user 206. On ear speakers may also include bone-conduction speakers or speakers that are fixed on the user's head near the user's ears. The system 200 may include a display (not shown) on which a visual object 204 may be presented to. The display may be a stationary display, a display on a handheld mobile device, or a head-mounted display. The display may include a 3D display (e.g., a stereoscopic display).

Visual object 204 may be a computer-presented 2D or 3D image or animation. It may include a visual representation of an application (e.g., an application window). The system 200 may obtain a size and/or other information of the visual object 204 related to how the visual object is to be presented to the display.

The system 200 may determine a virtual placement for each of a plurality of virtual speakers 214*a*, 214*b*, 214*c*, 214*e*, and 214*d*, at least based on the size of the visual object 204. The system may spatially render each of the plurality of virtual speakers (214*a*-214*e*) at each virtual placement through binaural audio. The speakers 216 and 218 may be driven with binaural audio to output the plurality of virtual speakers (214*a*-214*e*) to user 206 such that the virtual speakers (214*a*-214*e*) each appear to emanate from their respective virtual placements.

The system 200 may operate in a plurality of modes, which may be referred to as one or more first modes (e.g., first mode 208 and first mode 210), and a second mode 212.

In the first mode, the virtual placement of each of the plurality of virtual speakers 214*a*-214*e* may be constrained to a sphere 202 around the user 206. In some examples, each and every one of the plurality of virtual speakers 214*a*-214*e* may be placed on the surface of sphere 202. User 206 may be located at the center of the sphere.

In the one or more first modes, the spacing between the virtual speakers 214*a*-214*e* may be determined based on size of the visual object 204. For example, in a first of the one or more first modes (e.g., first mode 210), the plurality of virtual speakers 214*a*-214*e* may be distributed on the sphere 202 around the user 206 with a first spacing (e.g., S1, S2, and S3) between the plurality of virtual speakers 214*a*-214*e*. This spacing may correspond to a first size of the visual object 204 (e.g., large).

In a second of the one or more first modes (e.g., first mode 208), the plurality of virtual speakers 214*a*-214*e* may be distributed on the sphere 202 with a second spacing (e.g., S S2', and S3') between the plurality of virtual speakers 214*a*-214*e* that corresponds to a smaller second size of the visual object 204. The second spacing (S1', S2', and S3') may be less than the first spacing (S1, S2, and S3). It is understood that as spacing between some of the virtual speakers get closer together, other virtual speakers may become placed farther apart. As such, the spacing may refer to clusters of the closest virtual speakers. As the spacing of those virtual speakers in a cluster increases, the clustered virtual speakers become spread across the sphere 202. In another example, distance S3 and S3' may be between virtual speakers 214*a* and 214*e*, and/or between virtual speakers 214*c* and 214*d*. As the distances S1, S2, and S3 decrease, the virtual speakers become clustered together (e.g., in a single cluster) in front of or at the visual object 204 (e.g., the second mode 212).

In some examples, each of the one or more first modes (e.g., 208, 210) defines a unique placement of the plurality of virtual speakers 214*a*-214*e*. In second mode 212, which may also be referred to as a small mode, each of the plurality of virtual speakers 214*a*-214*e* may be placed at the visual object 204 as shown. In the second mode 212, the virtual speakers 214*a*-214*e* may be placed directly on the visual object 204 or at a minimum distance such that they are each independently discernable. Further, in the second mode 212, the virtual placement of the plurality of virtual speakers 214*a*-214*e* may not be constrained to the sphere 202 around the user 206, rather they may be placed off the sphere 202 to provide further feedback to user 206 as to the different operating modes and the state of visual object 204.

In some examples, the second mode 212 is entered into (from any of the one or more first modes such as 208, 210) in response to the size of the visual object 204 being smaller than a threshold. Additionally, or alternatively, the second mode 212 may be entered into (from any of the one or more first modes), in response to a user input.

For example, user 206 may virtually move the visual object 204 within the immersive environment by virtually 'grabbing' the visual object 204 and placing the visual object in a different location on a display or in a virtual environment. While the visual object 204 is in this grabbed or transit state, the system 200 may operate in second mode 212. When the user releases or places the visual object 204 in a different position, then the system may transition to and operate in one of the first modes (e.g., 208, 210). As such, the system 200 may provide audio and visual feedback to a user in response to user behavior to provide a responsive user interface.

The system 200 may animate the movement of the virtual speakers 214*a*-214*e* as the system transitions between modes. For example, transitioning from any of the one or more first modes 208 or 210 to the second mode 212 may include animating movement of the plurality of virtual speakers 214*a*-214*e* from their respective spaced positions on the sphere 202 around the user 206 to being clustered together, placed at the visual object 204. As such, the user may hear the speakers travel from the spaced apart positions (in first mode 208 or 210) to the clustered together positions (in second mode 212) to provide additional user feedback that the system is changing modes. Similarly, transitioning out of the second mode 212 into any of the one or more first modes (e.g., 208, 210) may include animating movement of the plurality of virtual speakers from being placed at the visual object (as shown in second mode 212) to being at spaced positions constrained to the sphere 202 around the user 206 (as shown in the one or more first modes 208, 210).

Further, in some examples, the system 200 may preserve an overall acoustic energy of the plurality of virtual speakers between the different modes, to provide a congruent experience. Alternatively, the system may modify gain of some or all of the virtual speakers 214*a*-214*e* according to gain values which may be specific to each of the modes.

It should be understood that although shown with the arrangement of 214*a*-214*e*, the number of virtual speakers 214*a*-214*e* and their placement may vary depending on various conditions such as system resources, settings, artistic choice, or other conditions. The number of virtual speakers, once established, may remain the same regardless of transitions between the one or more first modes and the second mode. As such, the user 206 may be provided with an otherwise consistent experience between modes, except that the virtual speakers 214*a*-214*e* may become more enveloping when the visual object 204 is large, and less enveloping when the visual object 204 is small. Further, the system 200 may include a plurality of modes having more than three modes shown (e.g., two or more first modes), or less than the three modes shown. In some examples, each of the virtual speakers 214*a*-214*e* may correspond to a channel of a surround sound speaker format, as described in other sections.

Figure 3:
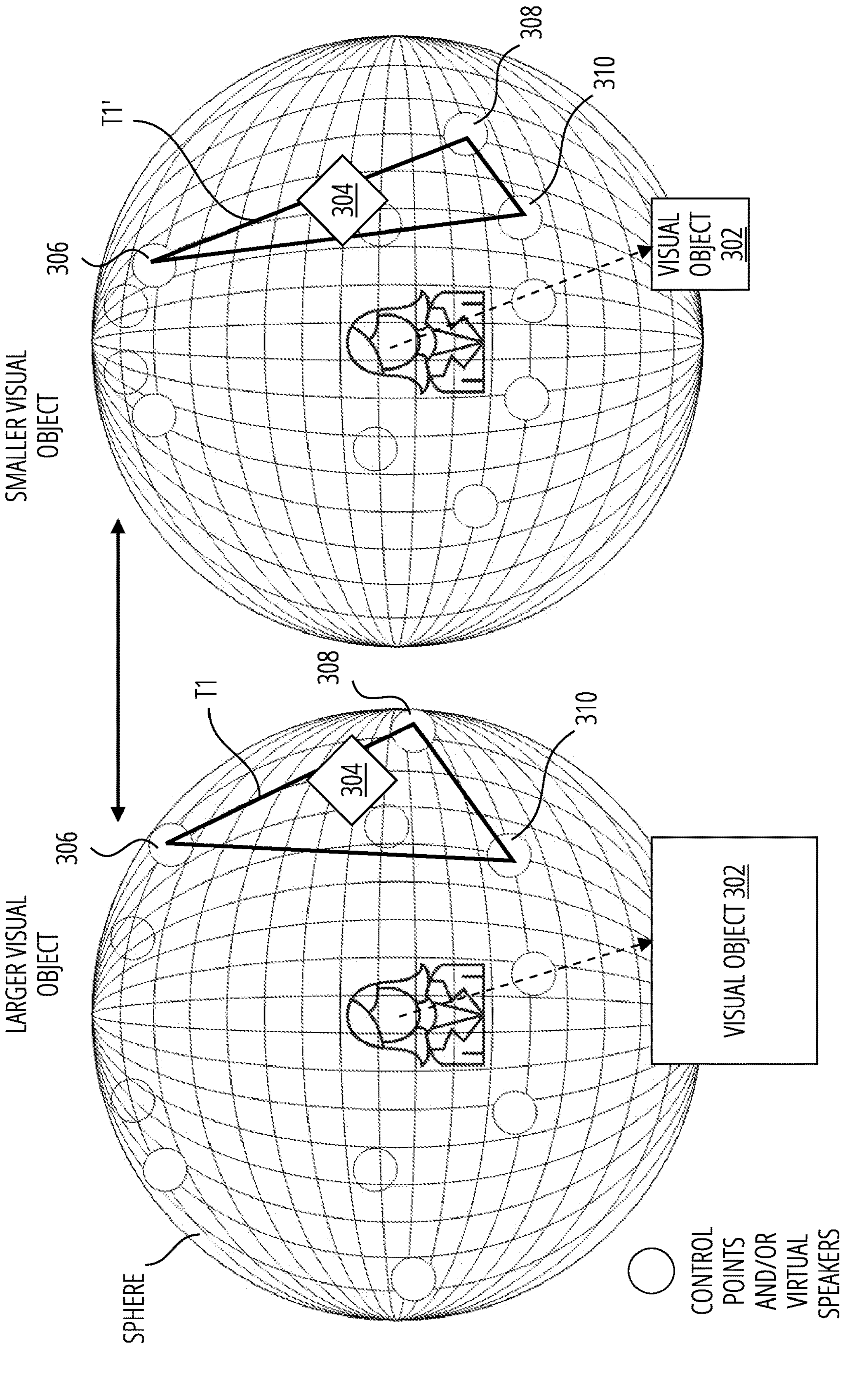
FIG. 3 shows an example of providing an immersive audio and visual experience with virtual speakers and a content agnostic approach, in accordance with some aspects.

FIG. 3 shows an example of providing an immersive audio and visual experience with virtual speakers and a content agnostic approach, in accordance with some aspects.

As described, a system may obtain one or more audio channels 304 which may have a base audio format and distribute each of the one or more audio channels 304 to the plurality of virtual speakers based on a position associated with each of the one or more audio channels 304.

For example, visual object 302 may be an application that presents audiovisual content that includes a surround sound speaker format (e.g., 5.1). Audio channel 304 may represent a front left channel of the surround sound speaker format. The system may obtain a predefined position associated with the front left channel (e.g., a preferred direction or position that may be relative to a listener).

In another example, audio channel 304 may represent a sound source (e.g., a bird) with an object-based audio format. The base audio format may include metadata describing the position of the sound source, which may or may not change over time.

Regardless of the format of the base audio, the position of a channel may be expressed as a direction, a distance, a relative position, and/or an absolute position. In some examples, the position may be defined as spherical coordinates (e.g., an azimuth angle, elevation angle, and/or distance) relative to an origin of the coordinates. In another example, the position may be defined as X, Y, Z coordinates. The position associated with the audio channel 304 may be expressed in various manners and may be expressed as desired.

In some examples, each and every one of the one or more audio channels 304 with based audio format may be mapped to the plurality of virtual speakers. The sound in audio channel 304 may be distributed to one or more of the plurality of virtual speakers by interpolation.

For example, audio channel 304 may be placed on the sphere based on its associated position. Audio channel 304 may be mapped to virtual speakers 306, 308, and 310 through interpolation. In some examples, the system may use the placements of virtual speakers 306, 308, and 310 as points on the sphere that form a polygon (e.g., a triangle T1) on the sphere. In response to audio channel 304 being placed on the sphere within the borders of the polygon, audio channel 304 may be distributed to those virtual speakers 306, 308, and 310, and not the other virtual speakers. The distribution may be distance-based. For example, audio channel 304 may have a larger contribution to virtual speaker 308 than to virtual speaker 310 or virtual speaker 306, based on being closer to virtual speaker 308. Each of the one or more audio channels 304 may be similarly mapped to the same virtual speakers, or to different virtual speakers, depending on their respective positions.

In some examples, the system may map the one or more audio channels 304 to the virtual speakers using vector-base amplitude panning (VBAP). The system may define a plurality of control points on the surface of sphere to form polygons (e.g., triangle T1) on the surface of the sphere. In some aspects, some of the points may correspond to placements of the virtual speakers. For example, triangle T1 may be formed from connecting three points on which each of virtual speakers 306, 308, and 310 are placed.

In response to a change in modes, or to user movement, or to a change in size of location of the visual object 302, the system may warp the positions of the points to new locations on the sphere, but with the constraint to preserve the arrangement of the polygons. For example, the surface of the sphere may be warped to change the position of virtual speaker 306, 308, and/or 310, thereby forming an altered polygon T1' with different shape than T1. Each point inside new triangle T1' may geometrically map to a point in T1. As such, the new location of channel 304 in triangle T1' may be obtained by moving one or more of the virtual speakers 306, 308, and/or 310. The audio channel 304 may be distributed accordingly to those virtual speakers based on the updated position in T1'.

In some aspects, the system may manage a set of control points on the sphere. For example, each of the virtual speakers 306, 308, and 310 may represent a control point on the sphere, rather than the virtual speakers. The system may render each of the one or more audio channels 304 as one of the plurality of virtual speakers, rather than distribute the channels among the virtual speakers. The virtual placement of each of the plurality of virtual speakers may correspond to a position associated with each of the one or more audio channels. For example, a loudspeaker position in a surround sound format, or a sound source in an object-based audio format, may be mapped onto the sphere relative to the visual object 302, with a position on the sphere that matches or best replicates that position of the audio channel.

Each of the one or more audio channels may correspond to a respective one of the virtual speakers on a one-to-one basis. For example, if a sound scene that is represented as object-based audio has four active sound sources (e.g., audio channels), then the system may render four virtual speakers with virtual placements that match the positions of those sound sources in the sound scene. Similarly, if the base audio format comprises 7.1 surround, then each of the audio channels of 7.1 may be rendered as a virtual speaker with a virtual placement that matches the intended or ideal position as defined by the 7.1 surround sound speaker format. The center channel may be anchored to visual object 302, as described.

The one or more audio channels may be mapped to the virtual placement of each of the plurality of virtual speakers using vector-base amplitude panning (VBAP). The system may interpolate between control points (e.g., between virtual speakers 306, 308, 310), to place each of the one or more audio channels 304 at its respective virtual placement. The system may adjust placements for the virtual speakers and/or animate the virtual speakers so as to move the audio channels 304, by moving one or more of the control points (as virtual speakers 306, 308, 310) from between its position T1 to its position T1'.

In such a manner, the system may collectively obtain an updated position of one or more audio channels 304 and a plurality of the virtual speakers on the sphere by simply warping the surface of the sphere (e.g., moving one or more predefined points on the sphere). As a byproduct, the system may maintain integrity and positional relationships among the virtual speakers and the distribution of the one or more audio channels 304 within the virtual speakers.

Figure 4:
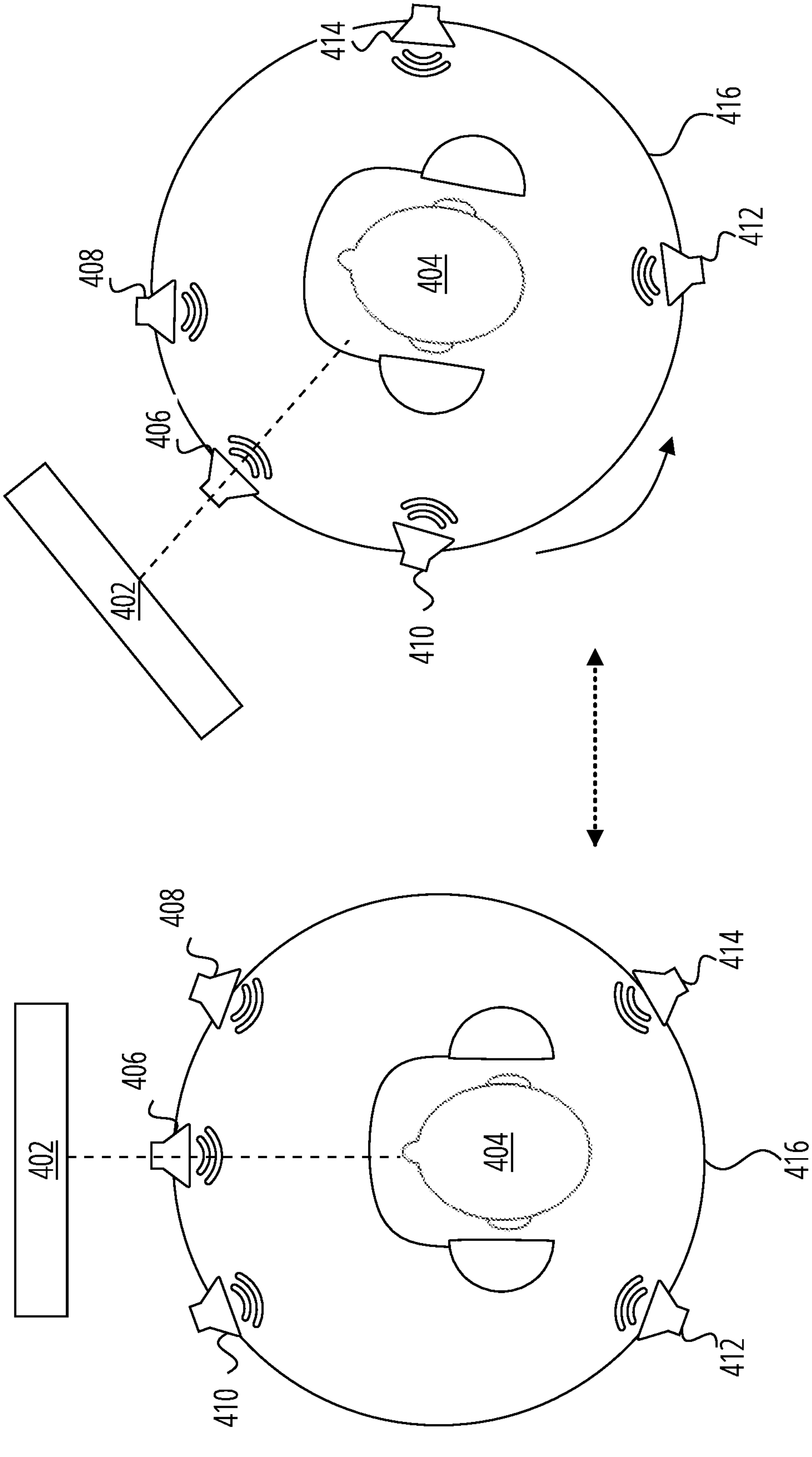
FIG. 4 shows an example of providing an immersive audio and visual experience with virtual speakers and position tracking, in accordance with some aspects.

FIG. 4 shows an example of providing an immersive audio and visual experience with virtual speakers and position tracking, in accordance with some aspects.

Visual objects may be presented to a stationary or mobile display that is anchored in the physical environment or anchored to a virtual location in an XR environment.

As described in other sections, a system may generate binaural audio that contains a plurality of virtual speakers 406, 408, 410, 412, and 414. These plurality of virtual speakers may be placed on a sphere 418. Further, these virtual speakers may be placed (e.g., spaced) according to a size of visual object 402. One or more sensors may track position of a user 404. This may include inside-out tracking (e.g., through sensors on a head-worn device) or outside-in tracking (e.g., through sensors placed in the physical environment of the user) or a combination thereof. The system may apply one or more head-tracking algorithms to sensor data (e.g., from an IMU and/or camera images) to track the position of the user's head. The user's head may move physically and/or relative to visual object 402.

In response to movement of the user 404 (e.g., the user's head), or a change in position of the visual object 402, or both, placement of the virtual speakers on the sphere 418 may maintain their position relative to each other and compensate for the user movement by rendering the virtual speakers to maintain their virtual placements relative to the visual object 402. A spatial relationship of the virtual speakers with respect to the visual object may be maintained by rotating the speakers. For example, placement of a center virtual speaker 406 may be maintained as being over or oriented at the visual object 402, relative to the position of user 404. In some examples, the sphere 418 may be rotated to compensate for the user's position relative to the visual object 402, thereby simultaneously maintaining the relative positions of the virtual speakers 406, 408, 410, 412, and 414, while updating their position relative to user. The virtual speakers on the sphere may be rotated such that virtual placement of the center virtual speaker 406 is maintained between the user 404 and the visual object 402.

Without compensation, the virtual speakers 406, 408, 410, 412, and 414, would appear to remain anchored relative to the user's head position, which may provide an unrealistic or disorienting experience when the user moves or when the position of the visual object 402 changes relative to the user.

Figure 5:
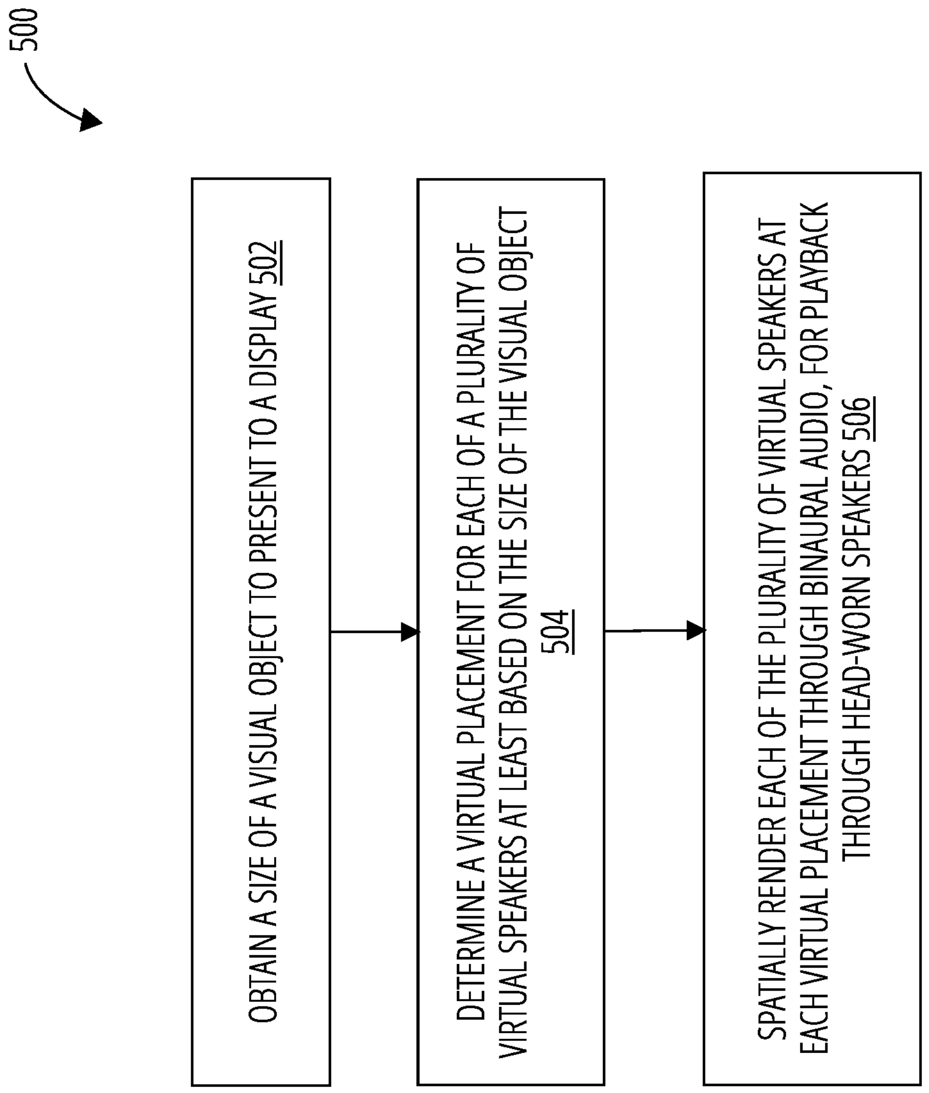
FIG. 5 illustrates an example method of providing an immersive audio and visual experience with virtual speakers, in accordance with some aspects.

FIG. 5 illustrates an example method 500 of providing an immersive audio and visual experience with virtual speakers, in accordance with some aspects. The method may be performed with various aspects described. The method may be performed by processing logic of a capture device, an audio processing device, or a combination thereof. Processing logic may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all of the blocks in the method may be performed.

At block 502, processing logic may obtain a size of a visual object (e.g., to present to a display). In some examples, processing logic may also be responsible for rendering the visual object at a desired location and size and thus have access to the size at which it renders the visual object. In other examples, processing logic may obtain the size or other information of the visual object which may be electronically accessible (e.g., stored in computer-readable memory). The visual object may include a visual representation of an application (e.g., a window of a movie player, music player, browser, videogame, etc.). In some aspects, processing logic may obtain status of the visual object, which may include whether the visual object is associated with a 'small,' 'medium,' or 'large' sound stage, or other information about how the visual object is to be presented.

At block 504, processing logic may determine a virtual placement for each of a plurality of virtual speakers at least based on the size of the visual object. For example, processing logic may determine a first virtual placement at position 'A' for a first virtual speaker. Processing logic may determine a second virtual placement at a position 'B' for a second virtual speaker. Each of the virtual placements may have various positions. The virtual placements may collectively be arranged according to operational modes. For example, if the size falls within a first range, the plurality of virtual speakers may be placed according to a first mode. If the size falls within a second range, the plurality of virtual speakers may be placed according to a second mode, and so on. In some aspects, based on the status of the visual object, processing logic may determine the virtual placement for each of the plurality of virtual speakers. For example, predefined placements may be assigned for each soundstage.

At block 506, processing logic may spatially render each of the plurality of virtual speakers at the respective virtual placement through binaural audio, for playback through head-worn speakers. For example, processing logic may render the first virtual speaker at the virtual placement (e.g., position 'A'), and render the second virtual speaker at the second virtual placement (e.g., position T'), and so on. The spatial rendering may impart spatial cues that give each of the plurality of virtual speakers' spatial qualities when heard by a listener. The number of virtual speakers, as well as the placement of the virtual speakers, may vary. The plurality of virtual speakers may be rendered at their desired virtual placements in view of the location of the visual object and/or the position of the user, as described.

Figure 6:
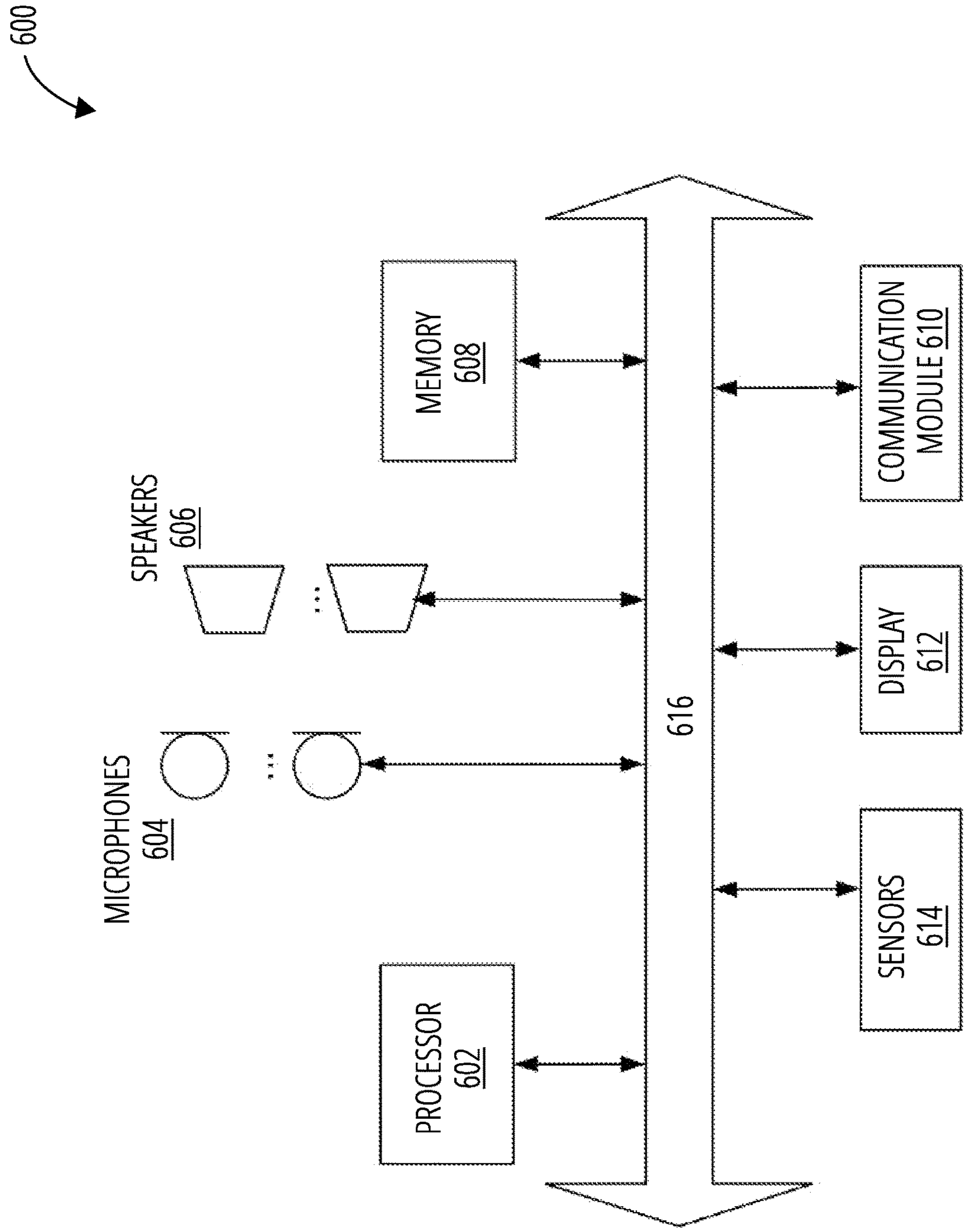
FIG. 6 illustrates an example of an audio processing system, in accordance with some aspects.

FIG. 6 illustrates an example of an audio processing system 600, in accordance with some aspects. In some examples, audio processing system 600 may correspond to an audio processing device, a display, and/or a playback device, as described herein. The audio processing system can be an electronic device such as, for example, a desktop computer, a tablet computer, a smart phone, a computer laptop, a smart speaker, a media player, a household appliance, a headphone set, a head mounted display (HMD), smart glasses, an infotainment system for an automobile or other vehicle, or other computing device. The audio processing system 600 can be configured to perform the method and processes described in the present disclosure.

Although various components of an audio processing system are shown that may be incorporated into headphones, speaker systems, microphone arrays and entertainment systems, this illustration is merely one example of a particular implementation of the types of components that may be present in the audio processing system. This example is not intended to represent any particular architecture or manner of interconnecting the components as such details are not germane to the aspects herein. It will also be appreciated if other types of audio processing systems that have fewer or more components than shown can also be used. Accordingly, the processes described herein are not limited to use with the hardware and software shown.

The audio processing system can include one or more buses 616 that serve to interconnect the various components of the system. One or more processors 602 are coupled to bus as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 608 can include Read Only Memory (ROM), volatile memory, and non-volatile memory, or combinations thereof, coupled to the bus using techniques known in the art. Sensors 614 can include an IMU and/or one or more cameras (e.g., RGB camera, RGBD camera, depth camera, etc.) or other sensors described herein. The audio processing system can further include a display 612 (e.g., an HMD, or touchscreen display).

Memory 608 can be connected to the bus and can include DRAM, a hard disk drive or a flash memory or a magnetic optical drive or magnetic memory or an optical drive or other types of memory systems that maintain data even after power is removed from the system. In one aspect, the processor 602 retrieves computer program instructions stored in a machine-readable storage medium (memory) and executes those instructions to perform operations described herein.

Audio hardware, although not shown, can be coupled to the one or more buses in order to receive audio signals to be processed and output by speakers 606. Audio hardware can include digital to analog and/or analog to digital converters. Audio hardware can also include audio amplifiers and filters. The audio hardware can also interface with microphones 604 (e.g., microphone arrays) to receive audio signals (whether analog or digital), digitize them when appropriate, and communicate the signals to the bus.

Communication module 610 can communicate with remote devices and networks through a wired or wireless interface. For example, communication modules can communicate over known technologies such as TCP/IP, Ethernet, Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses can be connected to each other through various bridges, controllers and/or adapters as is well known in the art. In one aspect, one or more network device(s) can be coupled to the bus. The network device(s) can be wired network devices (e.g., Ethernet) or wireless network devices (e.g., Wi-Fi, Bluetooth). In some aspects, various aspects described (e.g., simulation, analysis, estimation, modeling, object detection, etc.,) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g., DRAM or flash memory). In various aspects, hardwired circuitry may be used in combination with software instructions to implement the techniques described herein. Thus, the techniques are not limited to any specific combination of hardware circuitry and software, or to any particular source for the instructions executed by the audio processing system.

In the description, certain terminology is used to describe features of various aspects. For example, in certain situations, the terms “logic,” “processor,” “manager,” “system,” “renderer,” “system,” “device,” “mapper,” “block,” may be representative of hardware and/or software configured to perform one or more processes or functions. For instance, examples of “hardware” include, but are not limited or restricted to, an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of “software” includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to convey the substance of their work most effectively to others skilled in the art. An algorithm is here, and, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system’s registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined, or removed, performed in parallel or in serial, as desired, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination of hardware devices and software components.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

While certain aspects have been described and shown in the accompanying drawings, it is to be understood that such aspects are merely illustrative of and not restrictive, and the disclosure is not limited to the specific constructions and arrangements shown and described, since various other modifications may occur to those of ordinary skill in the art.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.\

The following statements can now be made in view of the description above and the figures.

19. A non-transitory machine-readable medium having stored therein instructions that, when executed by a processing device, cause the processing device to:
    obtain a status of a visual object to present to a display;
    determine a virtual placement for each of a plurality of virtual speakers at least based on the status of the visual object; and
    spatially render each of the plurality of virtual speakers at each virtual placement through binaural audio comprising a left audio channel and a right audio channel, for playback through a plurality of speakers.
20. The non-transitory machine-readable medium of statement 19, further comprising moving the plurality of virtual speakers closer together in response to a size of the visual object becoming smaller and moving the plurality of virtual speakers apart in response to the size of the visual object becoming larger.
21. The non-transitory machine-readable medium of any one of statements 19-20, wherein, in a first mode, a virtual center channel of the plurality of virtual speakers is oriented relative to a position of the visual object.
22. The non-transitory machine-readable medium of any one of statements 19-20, wherein, in a first mode, virtual placements of the plurality of virtual speakers are constrained to a sphere around a user position.
23. The non-transitory machine-readable medium of statement 22, wherein, in the first mode, in response to movement of a user head, the plurality of virtual speakers is rotated on the sphere to maintain a spatial relationship with respect to the visual object.
24. The non-transitory machine-readable medium of any one of statements 19-23, wherein determining the virtual placement for each of a plurality of virtual speakers at least based on the status of the visual object comprises:
    in accordance with a determination that the status of the visual object satisfies a first criterion, operating in one or more first modes, wherein the plurality of virtual speakers are distributed on a sphere around a listening position with a first spacing between the plurality of virtual speakers that corresponds to a first size of the visual object, and wherein the plurality of virtual speakers are distributed on the sphere with a second spacing between the plurality of virtual speakers that corresponds to a smaller second size of the visual object, wherein the second spacing is less than the first spacing.
25. The non-transitory machine-readable medium of statement 24, wherein each of the one or more first modes defines a unique placement of the plurality of virtual speakers.
26. The non-transitory machine-readable medium of statement 24, wherein determining the virtual placement for each of a plurality of virtual speakers at least based on the status of the visual object comprises:
    in accordance with a determination that the status of the visual object satisfies a second criterion, operating in a second mode in which each of the plurality of virtual speakers are placed at the visual object.
27. The non-transitory machine-readable medium of statement 26, wherein in the second mode, the virtual placement of the plurality of virtual speakers are not constrained to a sphere around a listening position, and in a first mode, the virtual placement of the plurality of virtual speakers are constrained to the sphere.
28. The non-transitory machine-readable medium of any one of statements 26-27, wherein the second criterion comprises a size of the visual object being smaller than a threshold.
29. The non-transitory machine-readable medium of any one of statements 26-28, wherein the second criterion is satisfied in response to a request to move the visual object.
30. The non-transitory machine-readable medium of statement 26, wherein the status of the visual object satisfies the first criterion, and the instructions cause the processing device to:
    obtain an updated size of the visual object; and
    in accordance with a determination that the updated size of the visual object satisfies a second criterion, transition to a second mode by animating movement of the plurality of virtual speakers from their respective virtual placements on the sphere to the visual object.

31. The non-transitory machine-readable medium of statement 19 wherein the instructions cause the processing device to:
obtain an updated size of the visual object; and
in accordance with a determination that the updated size of the visual object satisfies a first criterion, transition to one or more first modes by animating movement of the plurality of virtual speakers from the visual object to respective virtual placements distributed on a sphere.
32. The non-transitory machine-readable medium of statement 31 wherein transitioning to the one or more first modes includes preserving an overall acoustic energy of the plurality of virtual speakers.
33. The non-transitory machine-readable medium of statement 32, wherein the instructions cause the processing device to: obtain one or more audio channels with a base audio format, and render each of the one or more audio channels as a corresponding one of the plurality of virtual speakers, wherein the virtual placement of each of the plurality of virtual speakers is determined based on a position associated with each of the one or more audio channels.
34. The non-transitory machine-readable medium of statement 33, wherein the one or more audio channels are mapped to the virtual placement of each of the plurality of virtual speakers using vector-base amplitude panning (VBAP).
35. The non-transitory machine-readable medium of statement 33, wherein the base audio format includes at least one of: a multi-channel speaker layout, a monophonic audio channel, stereo, spherical harmonics, or object-based audio.
36. The non-transitory machine-readable medium of statement 33, wherein the instructions cause the processing device to interpolate between control points to place each of the one or more audio channels at virtual placements as the plurality of virtual speakers.
37. An audio system, comprising a plurality of speakers, a display, and a processor configured to:
obtain a size of a visual representation of an application to present to the display;
determine a virtual placement for each of a plurality of virtual speakers at least based on the size of the visual representation of an application; and
spatially render each of the plurality of virtual speakers at each virtual placement through binaural audio comprising a left audio channel and a right audio channel, for playback through the plurality of speakers.
38. The audio system of statement 37, further comprising moving the plurality of virtual speakers closer together in response to the size of the visual object becoming smaller and moving the plurality of virtual speakers apart in response to the size of the visual object becoming larger.
39. The audio system of any one of statements 37-38, wherein, in a first mode, a virtual center channel of the plurality of virtual speakers is oriented relative to a position of the visual object.
40. The audio system of any one of statements 37-39, wherein, in a first mode, the virtual placement of each of the plurality of virtual speakers are constrained to a sphere around a user position.
41. The audio system of any one of statements 38-40, wherein, in the first mode, in response to movement of a user head, the plurality of virtual speakers are rotated on the sphere to maintain a spatial relationship with respect to the visual object.
42. The audio system of any one of statements 37-41, wherein determining the virtual placement for each of a plurality of virtual speakers at least based on the size of the visual object comprises:
in accordance with a determination that the size of the visual object satisfies a first criterion, operating in one or more first modes, wherein the plurality of virtual speakers are distributed on a sphere around a listening position with a first spacing between the plurality of virtual speakers that corresponds to a first size of the visual object, and wherein the plurality of virtual speakers are distributed on the sphere with a second spacing between the plurality of virtual speakers that corresponds to a smaller second size of the visual object, wherein the second spacing is less than the first spacing.
43. The audio system of statement 42, wherein each of the one or more first modes defines a unique placement of the plurality of virtual speakers.
44. The audio system of any one of statements 38-43, wherein determining the virtual placement for each of a plurality of virtual speakers at least based on the size of the visual object comprises:
in accordance with a determination that the size of the visual object satisfies a second criterion, operating in a second mode in which each of the plurality of virtual speakers are placed at the visual object.
45. The audio system of statement 44, wherein in the second mode, the virtual placement of the plurality of virtual speakers are not constrained to a sphere around a listening position, and in a first mode, the virtual placement of the plurality of virtual speakers are constrained to the sphere.
46. The audio system of any one of statements 44-45, wherein the second criterion comprises the size of the visual object being smaller than a threshold.
47. The audio system of any one of statements 44-46, wherein the second criterion is satisfied in response to a request to move the visual object.
48. The audio system of any one of statements 44-47, wherein the size of the visual object satisfies the first criterion, and wherein the method further comprises:
obtaining an updated size of the visual object; and
in accordance with a determination that the updated size of the visual object satisfies the second criterion, transitioning to the second mode by animating movement of the plurality of virtual speakers from their respective virtual placements on the sphere to the visual object.
49. The audio system of any one of statements 44-47, wherein the size of the visual object satisfies the second criterion, and wherein the method further comprises:
obtaining an updated size of the visual object; and
in accordance with a determination that the updated size of the visual object satisfies the first criterion, transitioning to the one or more first modes by animating movement of the plurality of virtual speakers from the visual object to respective virtual placements distributed on the sphere.
50. The audio system of any one of statements 48-49, wherein transitioning to the second mode, or transitioning to the one or more first modes includes preserving an overall acoustic energy of the plurality of virtual speakers.

51. The audio system of any one of statements 37-50, further comprising obtaining one or more audio channels with a base audio format, and rendering each of the one or more audio channels as a corresponding one of the plurality of virtual speakers, wherein the virtual placement of each of the plurality of virtual speakers is determined based on a position associated with each of the one or more audio channels.
52. The audio system of any one of statements 37-51, wherein the one or more audio channels are mapped to the virtual placement of each of the plurality of virtual speakers using vector-base amplitude panning (VB AP).
53. The audio system of any one of statements 37-52, wherein the base audio format includes at least one of: a multi-channel speaker layout, a monophonic audio channel, stereo, spherical harmonics, or object-based audio.
54. The audio system of any one of statements 37-53, further comprising interpolating between control points to place each of the one or more audio channels at virtual placements as the plurality of virtual speakers.
55. A method for presenting a visual object along with audio of the visual object, the method comprising:
presenting, on a display, a visual object in accordance with a first visual characteristic, concurrently with presenting audio of the visual object in accordance with a first audio characteristic;
receiving a user input to select the visual object and in response, while the user input is maintained, changing presentation of the audio to be in accordance with a second audio characteristic and changing presentation of the visual object to be in accordance with a second visual characteristic; and
in response to the user input no longer being maintained, changing presentation of the audio to be in accordance with the first audio characteristic and changing presentation of the visual object to be in accordance with the first visual characteristic.
56. The method of statement 55 wherein the first audio characteristic comprises a plurality of virtual speakers having a first spacing therebetween, and the second audio characteristic comprises the plurality of virtual speakers having a second spacing therebetween, wherein the second pacing is smaller than the first spacing.
57. The method of statement 55 wherein the user input is to move the visual object.
58. The method of statement 57 wherein the first visual characteristic comprises a first size, and the second visual characteristic comprises a second size that is smaller than the first size.
59. The method of statement 55 wherein presenting audio of the visual object comprises presenting spatial audio of the visual object using a plurality of virtual speakers,
when presenting the visual object in accordance with the first visual characteristic, the spatial audio is presented in accordance with the first audio characteristic in which the plurality of virtual speakers are distributed around a listening position, and
when presenting the visual object in accordance with the second visual characteristic, the spatial audio is presented in accordance with the second audio characteristic in which the plurality of virtual speakers are located at the visual object.
60. The method of statement 59 wherein the user input is to move the visual object to a new position.
61. The method of statement 60 wherein changing presentation of the audio to be in accordance with the first audio characteristic comprises
presenting the spatial audio in accordance with the plurality of virtual speakers being distributed around the listening position relative to the new position of the visual object.
62. The method of statement 59 wherein the plurality of virtual speakers are distributed on a sphere around the listening position, i) with a first spacing between the plurality of virtual speakers, in the first audio characteristic, and ii) with a second spacing between the plurality of virtual speakers, in the second audio characteristic, the second spacing being smaller than the first spacing.
63. A non-transitory machine-readable medium having stored therein instructions that, when executed by a processing device, cause the processing device to perform a method according to any one of statements 55-62.
64. An audio system comprising a plurality of speakers, a display and a processor configured to perform a method for presenting a visual object along with audio of the visual object through the plurality of speakers and the display, according to any one of the statements 55-62.

What is claimed is:

1. A computer-implemented method, comprising:
obtaining a size of a visual object;
determining a respective virtual placement for each of a plurality of virtual speakers at least based on the size of the visual object, wherein the plurality of virtual speakers are distributed on a sphere around a listening position,
in accordance with a determination that the size of the visual object satisfies a first criterion, operating in one of a plurality of first modes in which the plurality of virtual speakers are distributed on the sphere with a first spacing therebetween that corresponds to a first size of the visual object, and
in accordance with a determination that the size of the visual object satisfies a second criterion, operating in another one of the plurality of first modes in which the plurality of virtual speakers are distributed on the sphere with a second spacing therebetween that corresponds to a second size of the visual object which is smaller than the first size of the visual object, the second spacing being less than the first spacing;
obtaining an updated size of the visual object;
in accordance with a determination that the updated size of the visual object satisfies the second criterion, transitioning to a second mode by animating movement of the plurality of virtual speakers from their respective virtual placements on the sphere to the visual object; and
spatially rendering each of the plurality of virtual speakers at the respective virtual placement through binaural audio comprising a left audio channel and a right audio channel, for playback through head-worn speakers.

2. The method of claim 1, further comprising moving the plurality of virtual speakers closer together in response to the size of the visual object becoming smaller and moving the plurality of virtual speakers apart in response to the size of the visual object becoming larger.

3. The method of claim 1, wherein, in one of the plurality of first modes, a virtual center channel of the plurality of virtual speakers is oriented relative to a position of the visual object.

4. The method of claim 1 wherein the respective virtual placement of each of the plurality of virtual speakers is constrained to the sphere around a user position.

5. The method of claim 4, wherein, in one or more of the plurality of first modes, in response to movement of a user head, the plurality of virtual speakers are rotated on the sphere to maintain a spatial relationship with respect to the visual object.

6. The method of claim 1, wherein each of the plurality of first modes defines a unique placement of the plurality of virtual speakers.

7. The method of claim 1, wherein in accordance with the determination that the updated size of the visual object satisfies the second criterion, operating in the second mode in which each of the plurality of virtual speakers is placed at the visual object.

8. The method of claim 7, wherein in the second mode, virtual placement of the plurality of virtual speakers is not constrained to a sphere around a listening position, and in the plurality of first modes, the virtual placement of the plurality of virtual speakers is constrained to the sphere.

9. The method of claim 7, wherein the second criterion comprises the size of the visual object being smaller than a threshold.

10. The method of claim 7, wherein the second criterion is satisfied in response to a request to move the visual object.

11. The method of claim 7, wherein the updated size of the visual object satisfies the second criterion, the method further comprising:

obtaining another updated size of the visual object; and in accordance with a determination that the another updated size of the visual object satisfies the first criterion, transitioning to another one of the plurality of first modes by animating movement of the plurality of virtual speakers from the visual object to respective virtual placements distributed on the sphere.

12. The method of claim 11, wherein transitioning to the second mode, or transitioning to the one or more of the plurality of first modes includes preserving an overall acoustic energy of the plurality of virtual speakers.

13. The method of claim 1, further comprising obtaining one or more audio channels with a base audio format and rendering each of the one or more audio channels as a corresponding one of the plurality of virtual speakers, wherein the respective virtual placement of each of the plurality of virtual speakers is determined based on a position associated with each of the one or more audio channels.

14. The method of claim 13, wherein the one or more audio channels are mapped to the respective virtual placement of each of the plurality of virtual speakers using vector-base amplitude panning (VBAP).

15. The method of claim 13, further comprising interpolating between control points to place each of the one or more audio channels at virtual placements as the plurality of virtual speakers.

16. The method of claim 13, wherein the base audio format includes at least one of: a multi-channel speaker layout, a monophonic audio channel, stereo, spherical harmonics, or object-based audio.

17. A non-transitory machine-readable medium having stored therein instructions that, when executed by a processing device, cause the processing device to:

obtain a status of a visual object to present to a display;

determine a virtual placement for each of a plurality of virtual speakers at least based on the status of the visual object, wherein the plurality of virtual speakers are distributed on a sphere around a listening position, in accordance with a determination that the status of the visual object satisfies a first criterion, operating in one of a plurality of first modes in which the plurality of virtual speakers are distributed on the sphere with a first spacing therebetween that corresponds to a first size of the visual object, and in accordance with a determination that the status of the visual object satisfies a second criterion, operating in another one of the plurality of first modes in which the plurality of virtual speakers are distributed on the sphere with a second spacing therebetween that corresponds to a second size of the visual object which is smaller than the first size;

obtain an updated size of the visual object;

in accordance with a determination that the updated size of the visual object satisfies the second criterion, transition to a second mode by animating movement of the plurality of virtual speakers from their respective virtual placements on the sphere to the visual object; and spatially render each of the plurality of virtual speakers at each virtual placement through binaural audio comprising a left audio channel and a right audio channel, for playback through a plurality of speakers.

18. The non-transitory machine-readable medium of claim 17, having stored therein further instructions that cause the processing device to move the plurality of virtual speakers closer together in response to a size of the visual object becoming smaller and move the plurality of virtual speakers apart in response to the size of the visual object becoming larger.

* * * * *